Fig. 3.

G. B. COLLIER.
APPARATUS FOR THE PRODUCTION OF EXPLOSIVE MIXTURES.
APPLICATION FILED JULY 10, 1917.

1,436,480.

Patented Nov. 21, 1922.

INVENTOR:
Guy B. Collier
by his Attorneys
Van Evera Fish & Hildreth

Patented Nov. 21, 1922.

1,436,480

UNITED STATES PATENT OFFICE.

GUY B. COLLIER, OF KINDERHOOK, NEW YORK.

APPARATUS FOR THE PRODUCTION OF EXPLOSIVE MIXTURES.

Application filed July 10, 1917. Serial No. 179,674.

*To all whom it may concern:*

Be it known that I, GUY B. COLLIER, a citizen of the United States, residing at Kinderhook, in the county of Columbia and State of New York, have invented certain new and useful Improvements in Apparatus for the Production of Explosive Mixtures; and I do hereby declare the following to be a full, clear, and exact description of the invention, such as will enable others skilled in the art to which it appertains to make and use the same.

The present invention relates to apparatus for the production of explosive mixtures, and more particularly to apparatus for the utilization of liquid fuels having a low volatility.

The desirability of a carbureter or other mechanism which shall produce an explosive mixture from kerosene has long been recognized. It is essential, however, more especially in connection with motor vehicles that a successful vaporizing apparatus of this character shall heat the explosive mixture to a substantially constant temperature independently of the volume of mixture which is flowing through the apparatus and that this heating of the mixture to a constant temperature shall be secured with a comparatively simple and compact construction.

An object of the present invention is to provide an improved form of apparatus for producing explosive mixtures which is capable of handling kerosene or other liquids of low volatility and under all conditions of service and temperature.

Accordingly, with this object in view, a feature of the invention contemplates the provision of means for initially mixing air and liquid fuel to form a saturated mixture, means for heating the resulting mixture to a comparatively high temperature, and means for thereafter introducing into the mixture dilution air at a lower temperature and for mixing the dilution air with the saturated mixture, thus forming the true explosive mixture for an internal combustion motor. With this construction only a sufficient amount of air to carry the fuel in suspension is initially employed, and this saturated mixture of air and liquid is heated to a comparatively high temperature whereby the air now contains fuel vapors which may be in the superheated state before the introduction of additional dilution air to form an explosive mixture. The dilution air is not heated to as high a degree as the saturated mixture and consequently the latter gives up some of its heat during the mixing process so that the resulting explosive mixture is at a lower temperature than the saturated mixture. According to this mode of operation a comparatively small body of the saturated mixture of air and liquid is heated to a high temperature and is thereafter augmented by the requisite volume of dilution air heated to a considerably lower temperature. This construction enables the required volume of explosive mixture to be produced in a most efficient and rapid manner and with an apparatus of the most compact character.

Still further features of the invention consist in certain novel features of construction, combinations and arrangements of parts hereinafter described and claimed, the advantages of which will be obvious to those skilled in the art from the following description.

In the accompanying drawings, illustrating the preferred form of the invention.

According to the present invention liquid fuel is first mixed with air to form a saturated mixture which is then heated to a comparatively high temperature, for example perhaps about 280°, and is then augmented by dilution air at a lower temperature to form an explosive mixture which enters the motor at a temperature lower than the saturated mixture, for example perhaps about 125°. The final temperature at which the explosive mixture enters the motor is maintained substantially constant independently of variations in the temperature of the atmospheric air, or variations in the volume of mixture passing through the apparatus. The automatic maintenance of a constant temperature independently of the extent of the throttle opening is a great desideratum in apparatus of this character as the efficiency of the apparatus, to a great degree, depends upon the successful control of the temperature.

The apparatus shown in the illustrated embodiment of the invention comprises essentially an atomizer 20, an electric heater 22, an exhaust heater 23, and a final mixer 24, all of which are interconnected with one another and with the throttle connection to secure the cojoint operation of the several elements of the apparatus.

Figure 5:
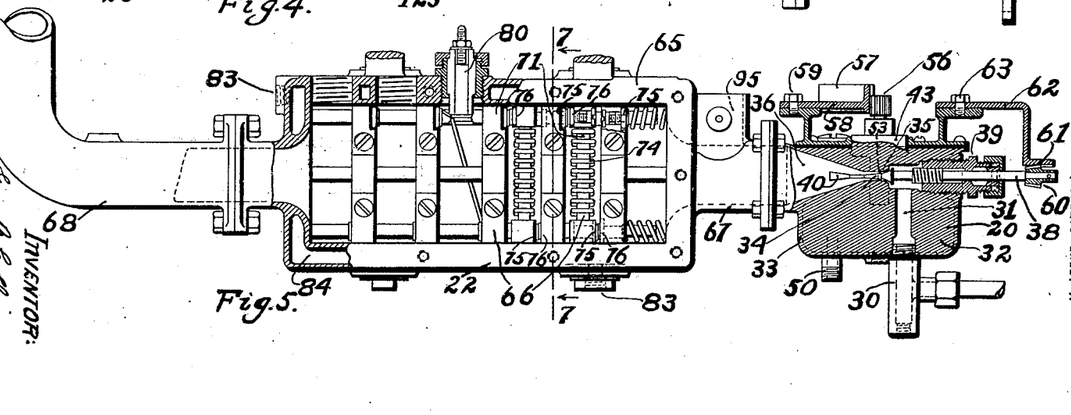
Fig. 5 is a detail illustrating a side elevation, partly in section, of the mixing devices and electric heater.
Figure 6:
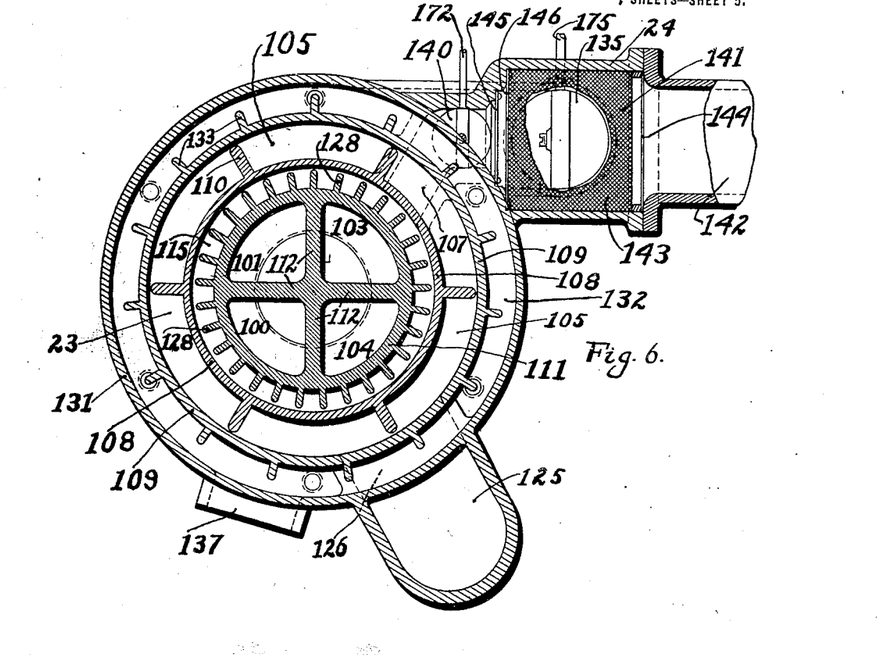
Fig. 6 is a detail illustrating a cross section of the exhaust heater taken upon the line 6—6 of Fig. 4.
Figure 7:
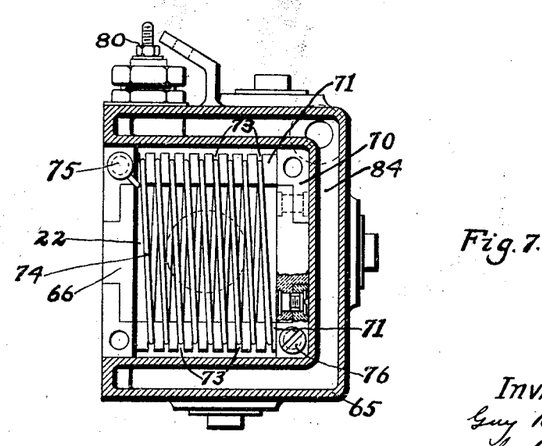
Fig. 7 is a detail showing a cross section of the electric heater taken upon the line 7—7 of Fig. 5.
Figure 9:
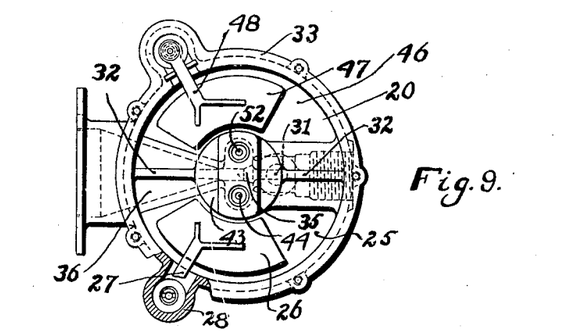
Fig. 9 is a detail showing the mixing bowl with the top removed and illustrating the arrangement of the devices for controlling the flow of air, liquid fuel and water.
Figure 10:
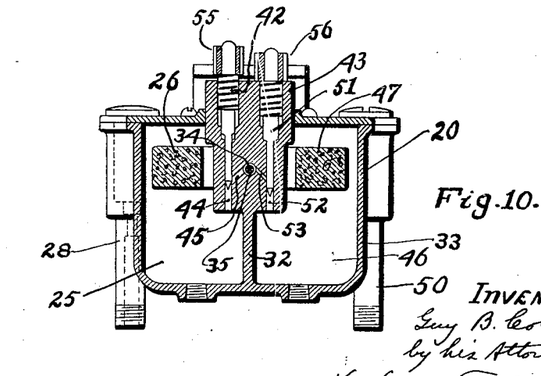
Fig. 10 is a detail illustrating a section in elevation upon the line 10—10 of Fig. 8.

The atomizer 20 comprises a float chamber 25 for the liquid fuel having the usual float 26 supported therein by an arm 27 and adapted to control the flow of liquid through an inlet pipe 28. The air for atomizing the liquid is admitted under pressure through an air pipe 30 which communicates with a vertical passage 31 formed in a web 32 which divides the bowl 33 of the mixer in two parts as shown clearly in Fig. 9 of the drawings. The flow of air through the passage is controlled by a valve 34 located in an orifice 35 which discharges into an outwardly flared discharge chamber 36 formed in the web 32 as shown clearly in Fig. 9. The valve 34 is provided with a stem 38 threaded in a sleeve 39 received in the side of the bowl 33 and is capable of movement to vary the flow of air through the orifice. In order to separate the atomized jet and cause a thorough intermixing of air from valve 95 and liquid the outer end 40 of the valve 34 extends into the discharge chamber 36 and is flared outwardly as shown clearly in Fig. 5 to form a cone-shaped discharge which is thoroughly impregnated with the liquid fuel. The flow of the liquid fuel from the float chamber 25 is controlled by a vertically disposed needle valve 42 threaded in an enlarged portion 43 of the web 32 and having its lower end disposed substantially at the intersection of a vertical passage 44 and an inclined fuel passage 45 which communicates with the orifice 35 surrounding the air valve 34. By suitably moving the nedle valve 42 the flow of liquid fuel to the orifice is controlled in the usual manner. It is desirable, in addition to the liquid fuel, to introduce a predetermined quantity of water into the explosive mixture. To this end a second float chamber 46 is formed in the bowl 33. This float chamber is provided with a float 47 supported by an arm 48 which controls the flow of water through an inlet pipe 50. The flow of water from the chamber 46 into the mixing chamber is controlled by a needle valve 51 supported vertically in the boss 43 at one side of the needle valve 42. The needle valve controls the flow of water through the vertical passage 52 and inclined passage 53 leading from the vertical passage into the orifice 35 on the opposite side from the passage 45. It will be observed that this forms an extremely simple and compact construction for controlling the atomizing air, water and liquid fuel. The several valves 34, 42 and 51 for controlling respectively the flow of air, liquid fuel and water automatically vary the rate of flow in accordance with varying throttle positions. Each of the valves 42 and 51 is threaded in the boss 43 and is provided upon its upper end with pinions 55 and 56, respectively, which are engaged and rotated by a gear segment 57 mounted upon the outer end of an arm 58 fulcrumed at 59 upon the upper portion of the bowl. The air valve 34 is provided with a beveled pinion 60 secured to the outer end of the stem 38 and engaged by a gear segment 61 formed upon the lower end of an arm 62 fulcrumed upon the bowl at 63. These above described connections for adjusting the air and liquid valves are automatically operated by controlling mechanism to be hereinafter described.

It is desirable that only sufficient air shall be used in the atomizer 20 to atomize the liquids and act as a medium for conveying the requisite volumes of liquids till it receives auxiliary saturation air and accordingly the mixture of air and liquid coming from the atomizer holds particles of the liquid in suspension, the air in this case being substantially supersaturated. In order to afford a remedy for this condition a valve indicated at 95 is located above a passage 67 and is arranged to admit the balance of air prior to the passage of the mixture into the electric heater, this air being sufficient in amount to hold the liquid vapors saturated upon receipt of the proper amount of heat.

The mixture of air and liquid vapor is heated to a predetermined temperature. This heating at larger throttle openings is intended to be accomplished primarily through a heater 23 which utilizes the heat of the exhaust gases, but at certain periods for example during the low throttle openings and during the starting of the motor, the heat imparted to the mixture by the exhaust heater 23 is insufficient to raise the mixture to the desired temperature, and this heater is, therefore, supplemented by an electric heater 22 interposed between the atomizer 20 and the heater 23. The electric heater comprises a casing 65 of substantially rectangular form having a series of heating units 66 supported therein. The casing 65 is connected at opposite ends with a passage 67 leading to the discharge chamber and a passage 68 leading to the exhaust heater. The separate heating units 66 each consists of a frame 70 of insulating material having cross members 71 each provided with a plurality of grooves 73 for the reception of the heating resister consisting of a spiral of wire 74 which is connected at its opposite ends to the terminals 75 and 76. The heating units extend across the heater casing and are supported so that the spirals of successive units extend at right angles as shown clearly in Fig. 5 of the drawings. In order to control the degree of heat imparted to the mixture by the electric heater the latter is arranged in three separate divisions which are successively thrown into operation. The first division consists of five heating frames which are connected with a terminal 80 threaded in the upper portion of the heater casing, as shown clearly in Fig. 5. The successive heating units consist respectively of one frame each, and are connected to the terminals 81 and 82. The electric heater is provided with a water jacket 84 which may be connected with circulating pipes through threaded openings 83.

Figure 1:
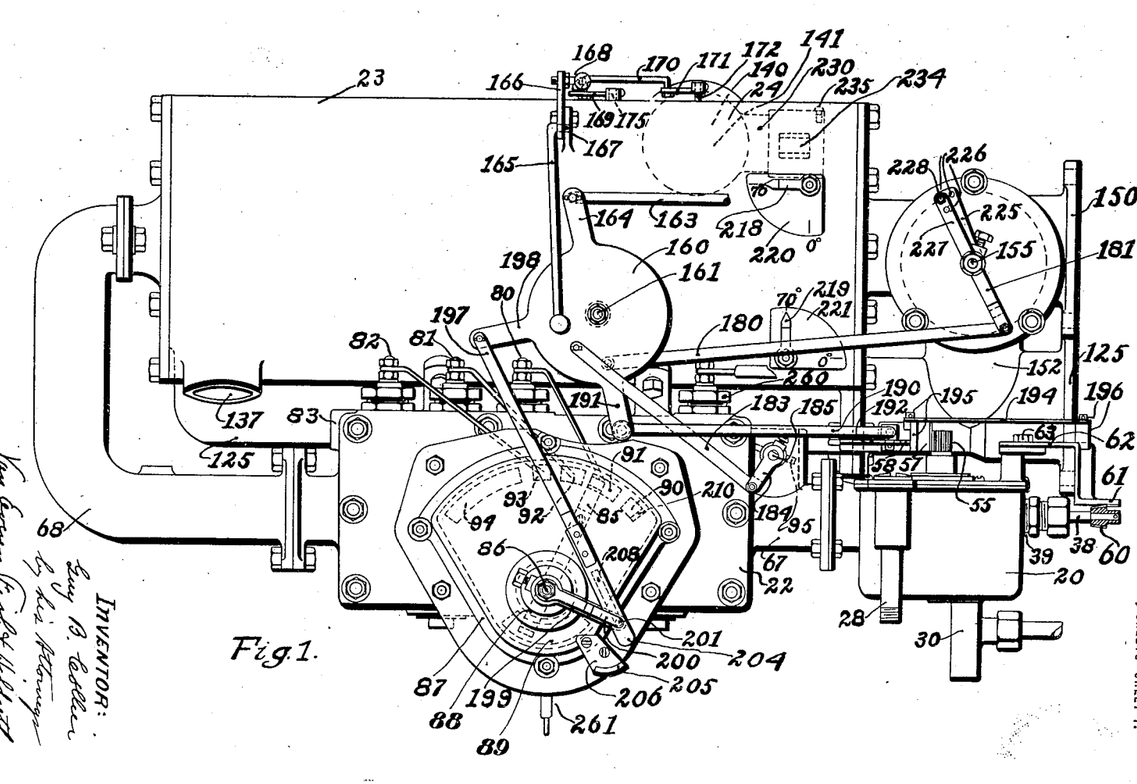
Figure 1 represents a side elevation of the improved apparatus.

The heating units are automatically controlled through a switch consisting of a contact arm 85 fulcrumed at 86 within a switch casing 87 and having its outer end arranged to engage with one of a series of contacts as shown clearly in Fig. 1, the opposite end 88 of the arm engaging with a contact 89 to complete the circuit. When the arm 85 engages with a member 90 alone the circuit is broken and none of the heating units are energized. When the arm is moved to engage with the contact 91 the first five heating frames are brought into operation, and as the arm is moved to engage successively with the contacts 92 and 93 the next two heating units are cut into the circuit in series with the first unit. The circuit for energizing the heating units is of substantially constant voltage, and as the various heating units each consists of a length of resistance wire, the addition of each heating unit exerts a greater resistance in the circuit, thereby cutting down the current which passes through the units. The result of this construction is that the addition of the successive heating units actually decreases the heating effect of the heater as a whole. When the arm 85 is moved beyond the contact 93 to the contact 94 all of the heating units are cut out of the circuit and the heater 22 is rendered electrically inoperative. The switch for controlling the operation of the several heating units is actuated in harmony with the other elements of the system through connections to be hereinafter described.

The vaporous mixture, which may or may not have been primarily heated in the electric heater, is finally heated by the exhaust heater 23 through which the mixture is caused to pass. The exhaust heater comprises generally a cylindrical casing, in one end of which the mixture is directed and into the opposite end of which the exhaust gases are directed, the passages for the mixture being separated from the exhaust gas passages by thin walls having a high conductivity which causes the heat to be readily transferred from the exhaust to the mixture. The heater is designed to cause the passage of the exhaust gas back and forth throughout the length of the heater, thus imparting a large portion of the heat of the exhaust to the mixture without necessitating a cumbersome, bulky heater. In the illustrated embodiment of the invention the exhaust gases are directed from a passage 114 first through longitudinally extending passages 100 and 101 formed in a tapering cylindrical shell 111. After traversing throughout the length of the shell the exhaust gases are returned through passages 103 and 104 formed in the same shell. The shell is provided with transverse partitions 112 extending at right angles with one another and dividing the shell into four separate passages of equal cross sectional area. After the exhaust gases are returned through the passages 103 and 104 they are directed into a passage 105 formed between the two concentric cylindrical shells 108 and 109, the shell 108 having a radially disposed rib 110 to split the flow of gases, projecting into the passage 105 and arranged to afford sufficient conducting surface for extracting heat from the exhaust.

In order to afford the proper adjustment under widely varying conditions of temperature, for example at zero degrees F. and seventy degrees F., means are provided for either materially cutting down the heating effect of the exhaust gases or materially augmenting the heating effect of these gases that are available through the regulation of the valve 151. To this end a pair of valves 215 and 216 control the flow of exhaust gases to and from a chamber 217 through which the gases flow from the interior of the shell 111 into the annular passage 105. When the temperature of the outside air approximates seventy degrees, the valve 215 is closed and the valve 216 is open, permitting some of the exhaust gases to flow from 217 into the exhaust pipe 125 without being conducted through the annular passage 105. On the other hand when the temperature of the outside air is at zero degrees the valve 216 is closed and the valve 215 is open, permitting an influx of exhaust gas from the passage 114 directly into the chamber 217 and thence to 105; valve 151 being set to admit more exhaust, for a given throttle opening, in the zero weather. The position of these valves is conveniently shown through indicator members 218 and 219, respectively, which are adapted to be operated over temperature scales 220 and 221 secured to the side of the heater casing; as shown clearly in Figure 1. From the annular passage 105 the exhaust, from which the heat has been largely removed, is directed into a discharge pipe 125 communicating with the annular passage 105 through openings 126 and 127. The mixture of air and liquid fuel passes through the pipe 68 and is directed into a chamber formed in the opposite end of the heater and communicating with the annular passage 115 formed between the shells 111 and 108. As the exhaust gas is first directed through the passages in the shell 111, this shell is heated to a high degree, and in consequence causes a rapid heating of the mixture, which is aided by a series of radially disposed longitudinal ribs 128 formed upon the periphery of the shell 111 and extending into the passage 115. After traversing throughout the complete length of the passage 115 the mixture passes into an annular chamber 130 and thence into a passage 107 communicating with the final mixing chamber.

This heater is designed to raise the temperature of the mixture to a comparatively high degree, that is to say, perhaps 280° F. which may represent the approximate temperature at which the mixture leaves the heater. At this point the mixture is a saturated or a superheated vapor and it is essential that more air be injected into the mixture in order to dilute the latter and form the proper proportion of air and liquid for an explosive charge. If the saturated mixture should become heated to a higher degree than necessary, this additional air would be heated comparatively little so that the lower resulting temperature of the explosive mixture is the proper temperature at which the mixture should be introduced into the motor. The necessary heating of the dilution air is accomplished by directing the air which enters at 137 through an annular passage 132 formed between the shell 109 and the outer shell 131 of the heater. The shell 109 forms the outer surface of the annular passage 105 for the exhaust gases, and is provided with radially disposed ribs 133 which aid in the conducting of heat to the air. As the exhaust gases have cooled considerably before being directed into the passage 105, the amount of heat transmitted to the dilution air will be considerably less than that transmitted to the mixture, so that the dilution air is raised to a temperature considerably lower than that of the mixture. After passing through the annular passage 132 the air is directed into an outlet passage 134 which communicates with the final mixing chamber through an air valve 135.

Figure 4:
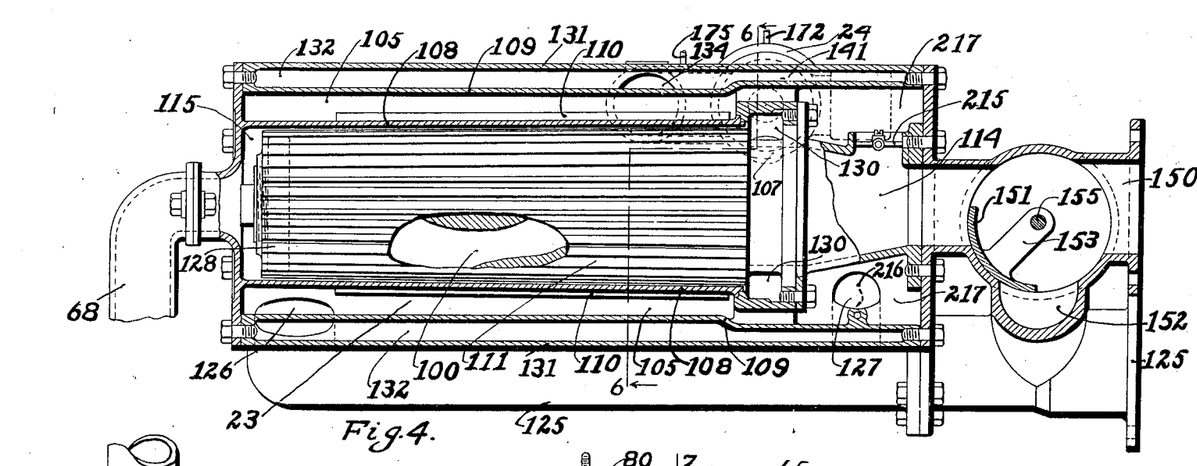
Fig. 4 is a detail showing a longitudinal section of the exhaust heater.

The usual throttle valve for controlling the supply of mixture to the motor is indicated at 140, and comprises a butterfly valve pivoted in the outlet passage 107. The saturated mixture passes from this point into a final mixing chamber 141 where it is mixed with an additional volume of dilution air, the supply of which is controlled through the valve 135. The properly proportioned charge then passes into the motor through a pipe 142. In order to secure a thorough mixing of the dilution air and the saturated mixture, a roll of gauze 143 extends about the mixing chamber, and the dilution air is compelled to pass through the sides of the roll while combining with the mixture which passes through the roll from end to end. In addition, gauze screens 144, 145 and 146 are located across the passage at opposite ends of the mixing chamber for limiting a possible back fire to the pipe 142 and mixing chamber. The heating effect of the exhaust heater is determined by the quantity of exhaust gas which flows therethrough, and this quantity is conveniently varied in accordance with the extent of the throttle opening. To this end the exhaust 150 is provided with a rotating segment 151 which is adapted to control the flow of the exhaust through the passage 114 leading to the heater, and a second passage 152 connecting directly with the exhaust pipe. The segmental valve 151 is secured to the end of an arm 153 connected to a rock shaft 155 which is operated automatically to gradually close the passage 114 as the throttle is opened. The valve is constructed and arranged to permit substantially all of the exhaust gas to pass into the heater when the throttle is only slightly open and to gradually close the passage into the heater until the valve reaches the position shown in Figure 4 when the throttle is completely open, this position being approximately that assumed by the valve when operating in cold weather.

Figure 8:
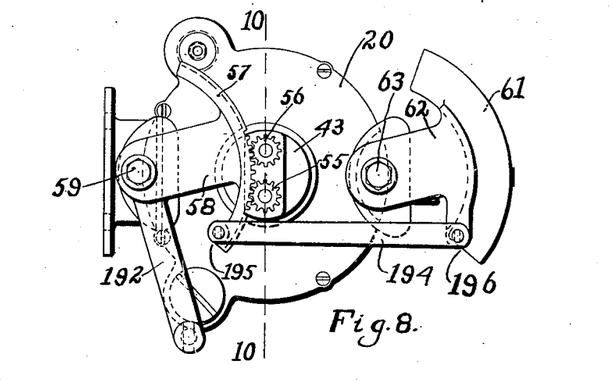
Fig. 8 is a detail illustrating a top plan view of the atomizing devices and operating connections.

The various parts of the apparatus are designed to operate in conjunction with one another and with the opening of the throttle valve. To this end all of the elements of the apparatus, including the throttle valve, are connected to a common actuator which is operated by the usual throttle control. An actuator 160, as shown clearly in Figure 1, is fulcrumed upon a shaft 161 secured upon the exhaust heater. This actuator is operated from the usual throttle control (not shown) through a rod 163 connected to the outer end of an arm 164 extending from the actuator. With this construction the movements of the throttle control to open or close the throttle rotate the actuator about the shaft 161. The throttle valve 140 is connected to the actuator through a link 165, a bell crank 166 fulcrumed upon the heater casing at 167, a second link 168, a second bell crank 169, and a link 170 connected to an arm 171 which is secured to the shaft 172 of the throttle valve 140. The valve for controlling the supply of dilution air is also operated through the link 168 and the bell crank 169 secured to the shaft 175 of the air valve 135. This construction causes the valves for controlling the mixture and dilution air to be controlled directly in accordance with the movements of the throttle control. The position of the valve 151 controlling the supply of exhaust gas to the heater is governed by an operating link 180 connected at opposite ends to the actuator and to an arm 181 connected with the shaft 155 of the valve. In order to provide for wide variations in temperature the arm 181 is adjustably connected to the shaft 155 through an arm 225 secured to the shaft having a series of openings 226 formed therein, and an arm 227 secured to the arm 181 and having a pin 228 adapted to register with one of the series of openings, as will be clearly evidenced from an inspection of Figure 1. With this construction the position of the valve at different throttle openings may be varied as desired. The air valve 95 is controlled in a like manner through a link 183 connected at its opposite ends to the actuator and to an arm 184 extending from the shaft 185 of the valve 95. The control of the valves for admitting water, oil and air to the discharge chamber 36 is secured by a link 190, connected at its opposite ends to an arm 191 extending from the actuator and an arm 192 secured to the shaft 59. With this construction, rotation of the actuator causes a rotation of the gear segment 57 about the shaft 59 to properly vary the liquid fuel and water valves through the pinions 55 and 56. The air valve is caused to vary in synchronism therewith through a link 194 connecting the adjacent ends of the gear segment 57 and the gear segment 67 which operates the air valve as shown clearly in Figure 8. This connection is through upstanding studs 195 and 196 formed on the ends of the adjacent segments, as shown clearly in Figure 1. The switch for controlling the electric heater is connected to the actuator by a link 197 having its opposite ends connected respectively to an arm 198 extending from the actuator and the arm 199 extending from the shaft 86, as shown clearly in Figure 1.

Figure 3:
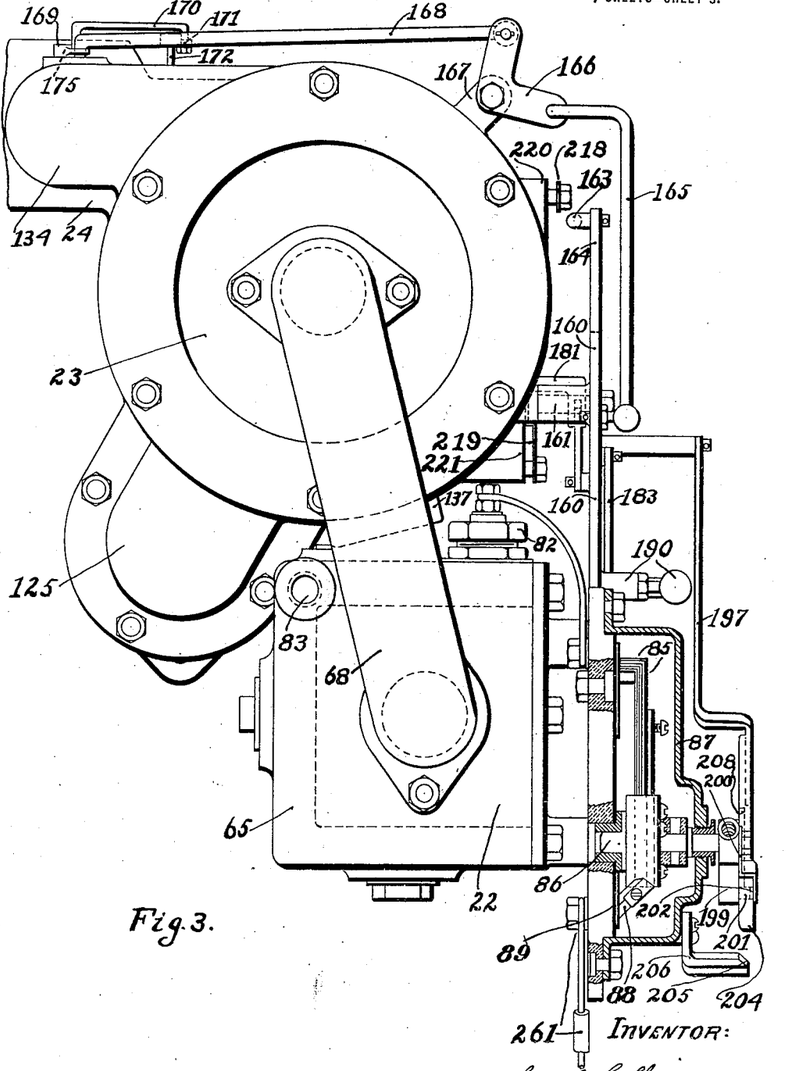
Fig. 3 is a left hand end view, partly in section of the apparatus shown in Fig. 1.

In order to provide a lost motion connection and permit initial movements of the actuator without causing like movements of the switch arm 85, a lost motion connection is provided between the link 197 and the arm 199. To this end the arm 199 has a spring 200 extending over the link 197 and is provided with a pin 201 received in a recess 202 formed in the end of the link 197, as shown in Figures 1 and 3. When the link is moved sufficiently to cause the end 204 to engage with a cam surface 205 formed upon a stationary bracket 206, the end of the link is lifted against the pressure of the spring 200 lifting the link 197 from the pin and permitting a further lengthwise movement of the link 197 without causing a like movement of the arm 199, the pin 201 then sliding in a longitudinal slot 208 formed in the arm 197. This break in the connection between the link and arm occurs when the switch arm 85 has been moved to a position in engagement with a shoulder 210 formed on the contact 90 and prior to the completion of the movement of the actuator during the closing movement of the throttle.

Figure 2:
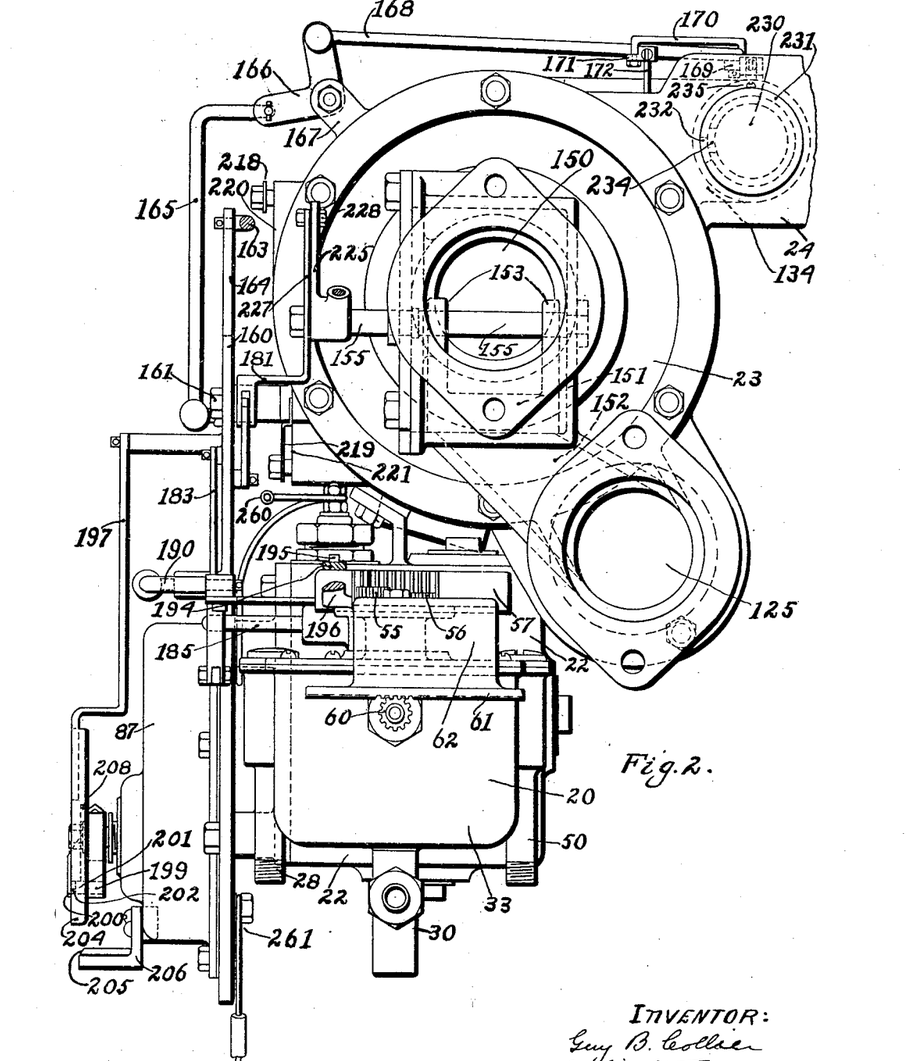
Fig. 2 is a right hand end view, partly in section, of the apparatus shown in Fig. 1.

The temperature of the explosive mixture may be regulated manually if so desired through the provision of an auxiliary air passage 230 leading into one side of the mixing chamber 141, as shown in Figures 1 and 2. The flow of air into this passage is controlled by a rotary sleeve 231 having an opening 232 formed therein which is adapted to register to a greater or less degree with an air inlet opening 234 formed in the side of the passage 230. By rotating this sleeve the intake of air at atmospheric temperature may be regulated as desired, a set screw 235 retaining the sleeve in adjusted position.

Figure 11:
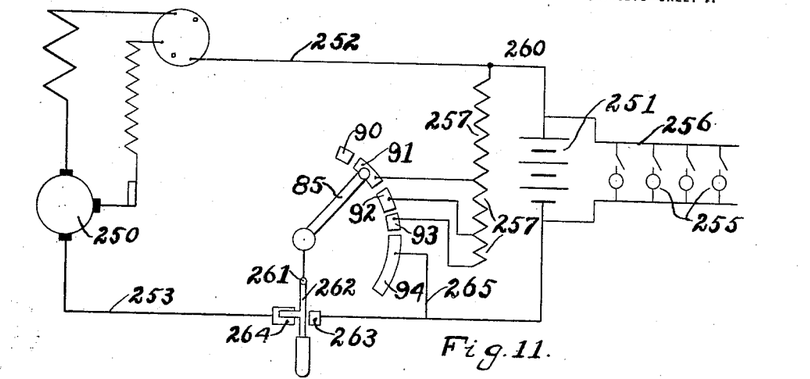
Figs. 11 to 13, inclusive, are diagrammatic views illustrating the embodiment of the electric heater in various types of ignition, lighting and starting circuits commonly employed on motor vehicles.
Figure 12:
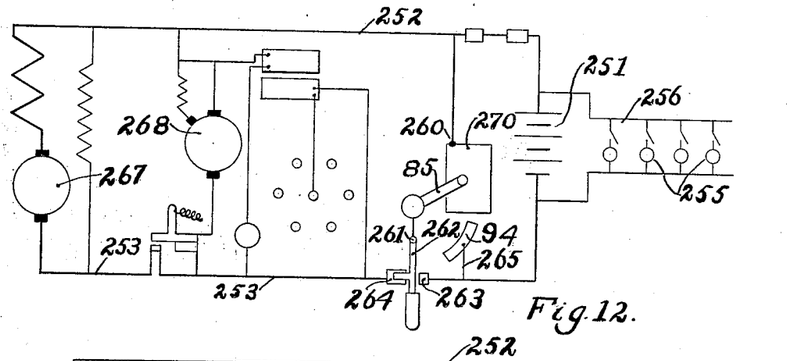
Figure 13:
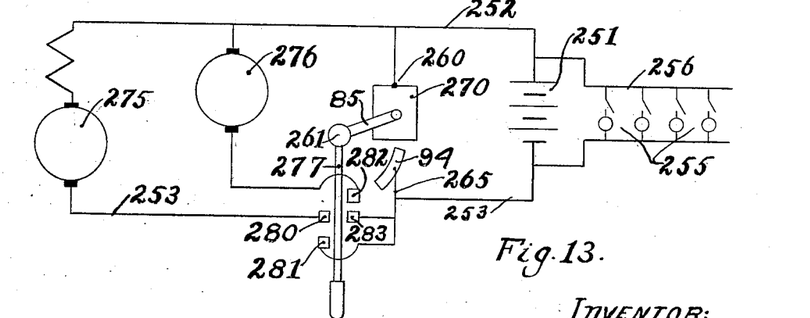

Figures 11 to 13, inclusive, illustrate diagrammatically the methods of incorporating the electric heater in the several electrical systems now used upon motor vehicles. In Figure 11 is shown the method of incorporating the heater in the single unit system having a motor generator 250, a storage battery 251 and main circuit leads 252 and 253 in which the storage battery and motor generator are located. The usual lights, indicated at 255, are located in a circuit 256 deriving its energy from the storage battery 251. The switch arm 85 of the heater is illustrated operating over the separate contact members 90 to 94, inclusive, to cut more or less of the resistance indicated at 257 into the circuit. The resistance indicated at 257 corresponds to the heating units or frames 66. The main heater terminals are indicated at 260 and 261 and the operation of the heater is controlled primarily by a main switch 262 of the double throw type so arranged that the circuit may be completed either through a contact 263 and a second contact 264 or through the contact 264 alone. When the electric heater is initially thrown in upon starting the motor the switch is thrown into engagement with the contact 263, thus closing the circuit through both the storage battery 251 and the motor generator 250. The storage battery will thus supply the requisite current to the heater until the engine is started and the voltage of the generator has been raised to the required degree, when the current for the heater will then be supplied by the generator relieving the storage battery of the load. If so desired, the switch may be then thrown into the position indicated in Fig. 11 in which the storage battery is cut out of the heater circuit and the current is necessarily supplied by the generator. The control of the heater will be obvious from an inspection of Fig. 11, the movement of the switch arm 85 across successive contacts gradually throwing a greater amount of resistance into the circuit until the switch arm reaches the contact 94 when the resistance 257 is completely cut out of circuit, the current then passing through the circuit lead 265 and the storage battery being charged. Fig. 12 illustrates diagrammatically the embodiment of the heater in what is known as the combined unit system in which the motor generator is provided with two separate windings indicated diagrammatically at 267 and 268. The remainder of the circuit including the embodiment of the heater therein is similar to that shown in Figure 11, the contacts and the resistances controlled thereby in this figure being indicated diagrammatically, however, at 270. In Figure 13 is shown the embodiment of the heater in a two unit system consisting of a separate motor and generator 275, 276, respectively, located in parallel circuits and controlled by a main switch 277. The usual storage battery 251 is adapted to be connected in circuit with either the motor or generator through the usual main circuit leads 252 and 253. The main switch arm 277 when moved into engagement with the contacts 280, 281, closes the circuit through the storage battery, the motor 275 and the heater, which is connected across the circuit through the terminals 260 and 261. When the internal combustion motor is started the switch arm 277 is moved into engagement with the contacts 282 and 283, which closes the circuit through the generator 276, the storage battery 251 and the electric heater. The resistance for the electric heater is indicated diagrammatically at 270 as in Figure 12.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. An apparatus for the production of explosive mixtures, comprising a bowl, a web dividing the bowl into two float chambers, an atomizing chamber formed in the web, an air passage formed in the web and communicating with the atomizing chamber, a liquid passage connecting the air passage with each float chamber, and a separate valve for controlling the flow of liquid through each passage.

2. An apparatus for the production of explosive mixtures, comprising a bowl, a web dividing the bowl into two float chambers, an atomizing chamber formed in the web, an air passage formed in the web and communicating with the atomizing chamber, a liquid passage connecting the air passage with each float chamber, and means for automatically controlling the flow of liquid through each passage in accordance with the throttle opening.

3. An apparatus for the production of explosive mixtures, having in combination, an atomizer, an electric heater having a plurality of heating units, means for conducting the atomized mixture through the heater, a switch for controlling the operation of the heater, a throttle valve, and connections between the throttle valve and switch constructed and arranged to successively throw into operation additional heating units as the throttle valve is opened.

4. An apparatus for the production of explosive mixtures, having in combination, an atomizer, an electric heater comprising a plurality of heating units, a switch for the heater, an operating arm for the switch, a throttle valve, and connections between the throttle valve and arm constructed and arranged to permit initial movements of the throttle valve without causing like movements of the arm.

5. An apparatus for the production of explosive mixtures, comprising an electric heater, a switch for the heater, a switch operating arm, a throttle valve, an actuator controlled by the movements of the throttle valve, a link connecting the actuator and arm, and a lost movement connection between the link and arm.

6. An apparatus for the production of explosive mixtures, comprising an atomizer, a plurality of concentric shells, means for initially conducting exhaust gases through the interior of the smallest shell and for thereafter conducting the exhaust gases through the annular space surrounding two larger shells, and means for conducting the saturated mixture of air and liquid fuel through the annular space surrounding the smallest shell.

7. An apparatus for the production of explosive mixtures, comprising a shell, means for admitting exhaust gases to the shell, a valve for controlling the admission of the exhaust gases to the shell, a throttle valve, connections between the throttle valve and admission valve for controlling the latter in accordance with the movements of the throttle valve, a pair of valves for controlling, respectively, the admission and discharge of exhaust gases to and from the shell, an indicator arm connected to each valve and a temperature scale over which the indicator arm travels to permit a manual regulation of the valves in accordance with variations in atmospheric temperature.

8. An apparatus for the production of explosive mixtures, comprising an atomizer, means for initially heating the atomized mixture to a predetermined temperature, means for heating dilution air to a lower temperature, means for thereafter mixing the atomized mixture and dilution air, and means for finally admitting air at atmospheric temperature to the heated mixture.

GUY B. COLLIER.